United States Patent
Rao Krishnagi et al.

(10) Patent No.: US 11,856,052 B2
(45) Date of Patent: Dec. 26, 2023

(54) SYSTEM AND METHOD FOR IMPLEMENTING A SMART CLOUD DEPLOYMENT MODULE

(71) Applicant: JPMorgan Chase Bank, N.A., New York, NY (US)

(72) Inventors: Kumar Rao Krishnagi, Powell, OH (US); Matthew J Porter, Mechanicsburg, OH (US); Laxman Dongisharapu, Hyderabad (IN); Vijay Kumar Perla, Westerville, OH (US); Nalini S Boda, Lewis Center, OH (US); Mark Alan Wells, Dublin, OH (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 60 days.

(21) Appl. No.: 17/648,968

(22) Filed: Jan. 26, 2022

(65) Prior Publication Data

US 2022/0263890 A1  Aug. 18, 2022

Related U.S. Application Data

(60) Provisional application No. 63/169,462, filed on Apr. 1, 2021.

(30) Foreign Application Priority Data

Feb. 18, 2021 (IN) .............................. 202111006852

(51) Int. Cl.
*H04L 67/1008* (2022.01)
*G06F 8/61* (2018.01)
(Continued)

(52) U.S. Cl.
CPC ............ *H04L 67/1008* (2013.01); *G06F 8/64* (2013.01); *G06F 8/65* (2013.01); *H04L 67/1036* (2013.01); *H04L 67/52* (2022.05)

(58) Field of Classification Search
CPC . H04L 67/52; H04L 67/1008; H04L 67/1036; G06F 8/64; G06F 8/65
See application file for complete search history.

(56) References Cited

U.S. PATENT DOCUMENTS 9,747,635 B1 *  8/2017  Ward, Jr. ............... G06Q 30/08
10,397,273 B1 *  8/2019  Stickle ................ H04L 63/1491
(Continued)

FOREIGN PATENT DOCUMENTS

WO      2017/112801       6/2017

OTHER PUBLICATIONS

Official Communication Received in PCT Application No. PCT/US2022/016774, dated Jun. 8, 2022.

*Primary Examiner* — Dhairya A Patel
(74) *Attorney, Agent, or Firm* — GREENBLUM & BERNSTEIN, P.L.C.

(57) ABSTRACT

Various methods, apparatuses/systems, and media for implementing a smart cloud deployment module is disclosed. A datacenter stores information data of all availability zones (AZs) associated with deployment of an application. A processor builds an availability zone (AZ) application programming interface (API) and calls the AZ API to retrieve the information data from the datacenter; dynamically and automatically determines, in response to calling the AZ API, prior to deploying the application, whether a first AZ defined in a deployment pipeline among the AZs within the datacenter is healthy for deployment of the application; and deploys the application utilizing the deployment pipeline when it is determined that the first AZ defined in the deployment pipeline is healthy. The processor also checks for another healthy AZ within the same datacenter or within other regions outside of the datacenter when it is determined that the first AZ is not healthy.

20 Claims, 8 Drawing Sheets

(51) Int. Cl.
  *G06F 8/65*      (2018.01)
  *H04L 67/1036*   (2022.01)
  *H04L 67/52*     (2022.01)

(56)           References Cited

U.S. PATENT DOCUMENTS

| | | | |
|---|---|---|---|
| 10,783,235 B1* | 9/2020 | Agarwal | G06F 21/45 |
| 10,999,163 B2* | 5/2021 | Abraham | H04L 41/0843 |
| 11,017,417 B1* | 5/2021 | Pohlack | G06F 9/45558 |
| 11,571,618 B1* | 2/2023 | Schuster | A63F 13/335 |
| 2014/0297866 A1* | 10/2014 | Ennaji | G06F 9/45533 |
| | | | 709/226 |
| 2014/0297867 A1* | 10/2014 | Ennaji | H04L 67/52 |
| | | | 709/226 |
| 2014/0297868 A1* | 10/2014 | Ennaji | H04L 47/828 |
| | | | 709/226 |
| 2016/0085643 A1* | 3/2016 | McAlister | H04L 41/069 |
| | | | 714/4.12 |
| 2016/0253211 A1 | 9/2016 | Franco et al. | |
| 2017/0180459 A1* | 6/2017 | Frank | H04L 41/0866 |
| 2018/0091621 A1* | 3/2018 | Kuo | H04L 67/565 |
| 2019/0116110 A1* | 4/2019 | Raney | G06F 8/60 |
| 2020/0204468 A1 | 6/2020 | Nickolov et al. | |
| 2020/0285525 A1* | 9/2020 | Agarwal | G06F 11/3024 |
| 2020/0351345 A1* | 11/2020 | Bansod | H04L 67/51 |
| 2020/0403870 A1* | 12/2020 | Goodman | H04L 41/0663 |
| 2022/0245094 A1* | 8/2022 | Jujjuri | G06F 16/148 |

\* cited by examiner

SYSTEM AND METHOD FOR IMPLEMENTING A SMART CLOUD DEPLOYMENT MODULE

CROSS-REFERENCE TO RELATED APPLICATIONS

This application claims the benefit of priority from U.S. Provisional Patent Application No. 63/169,462, filed Apr. 1, 2021, which is herein incorporated by reference in its entirety. This application also claims the benefit of priority from Indian Provisional Patent Application No. 202111006852, filed Feb. 18, 2021, which is herein incorporated by reference in its entirety.

TECHNICAL FIELD

This disclosure generally relates to application development, and, more particularly, to methods and apparatuses for implementing a smart cloud deployment module that enables application teams to deploy their applications to healthy availability zones (AZs), thereby improving efficiency and productivity in developing, deploying, and supporting an application.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

Today, across the multiple lines of businesses (LOB) at an organization, application developers are constantly faced with a daunting task of developing, testing, and deploying new applications for improving customer experience as well as productivity. As software applications become increasingly more complex, checking out the code, building, testing, and deploying such software applications also become more complex as a large number of unique combinations of paths and modules may be tested for each program. While conventional deployment and operational engines may help address some of the problem, one may still find that the deployment and operational focus required may be challenged at times based on other functional delivery priorities and operations experiences. For example, in clustered cloud platform solutions, there may be scenarios where one of the clusters may not have enough resources to be deployed to. However, conventional deployment and operational engines lack the capability of automatically determining capacity of the cluster before the deployment, thereby resulting in failed deployments where otherwise would have been successful if deployed to a different cluster.

SUMMARY

The present disclosure, through one or more of its various aspects, embodiments, and/or specific features or sub-components, provides, among other features, various systems, servers, devices, methods, media, programs, and platforms for implementing a smart cloud deployment module that enables application teams to deploy their applications to healthy availability zones, thereby improving efficiency and productivity in developing, deploying, and supporting an application, but the disclosure is not limited thereto. For example, the present disclosure, through one or more of its various aspects, embodiments, and/or specific features or sub-components, also provides, among other features, various systems, servers, devices, methods, media, programs, and platforms for implementing a smart cloud deployment module that builds an availability zone agnostic application that automatically determines capacity of an availability zone before the deployment and dynamically deploys to a new availability zone that has the required capacity, thereby reducing failed deployments, reducing support hours from application development and production support resources, shortening deployment windows, plugging and playing application programming interface (API) for quick integration with existing applications, dynamically migrating applications across availability zones, reducing production incidents and improving service level, but the disclosure is not limited thereto.

According to an aspect of the present disclosure, a method for implementing a smart cloud deployment module is disclosed. The method may include: providing a datacenter that stores information data corresponding to a plurality of availability zones associated with deployment of an application; building an availability zone application programming interface (API); calling the availability zone API to retrieve the information data corresponding to the plurality of availability zones from the datacenter; dynamically determining, in response to calling the availability zone API, prior to deploying the application, whether a first availability zone defined in a deployment pipeline among the plurality of availability zones within the datacenter has a required capacity for deployment of the application; and deploying the application utilizing the deployment pipeline when it is determined that the first availability zone defined in the deployment pipeline has the required capacity.

According to another aspect of the present disclosure, when it is determined that the first availability zone does not have the required capacity, the method may further include: dynamically identifying, in response to calling the availability zone API, a second availability zone that has a required capacity for deployment of the application among the plurality of availability zones within the same datacenter; automatically replacing the first availability zone from the deployment pipeline with the second availability zone; and deploying the application utilizing the deployment pipeline with the second availability zone.

According to yet another aspect of the present disclosure, the method may further include: calling a load balancer API after deployment of the application to update new internet protocol (IP) address for a load balancer associated with the deployment of the application in response to replacing the first availability zone with the second availability zone.

According to a further aspect of the present disclosure, the method may further include: calling a firewall API after deployment of the application to update firewall rules associated with the deployment of the application in response to replacing the first availability zone with the second availability zone.

According to an additional aspect of the present disclosure, wherein when it is determined that none of the availability zones among the plurality of availability zones within the same datacenter has the required capacity, the method may further include: dynamically identifying, in response to calling the availability zone API, a third availability zone that has a required capacity for deployment of the application from a new region outside of the datacenter; automatically replacing the first availability zone from the deployment pipeline with the third availability zone; and deploying the application utilizing the deployment pipeline with the third availability zone.

According to yet another aspect of the present disclosure, the method may further include: calling a load balancer API after deployment of the application to update new internet protocol (IP) address for a load balancer associated with the deployment of the application in response to replacing the first availability zone with the third availability zone.

According to an additional aspect of the present disclosure, the method may further include: calling a firewall API after deployment of the application to update firewall rules associated with the deployment of the application in response to replacing the first availability zone with the third availability zone.

According to a further aspect of the present disclosure, the method may further include: calling the availability zone API to retrieve information data corresponding to the deployment of the application from sources other than the datacenter.

According to yet another aspect of the present disclosure, the information data may include the following data: platform version that is being run, health information of all availability zones, and capacity details of all availability zones, etc., but the disclosure is not limited thereto.

According to an aspect of the present disclosure, a system for implementing a smart cloud deployment module is disclosed. The system may include a datacenter having memories to store information data of all availability zones (AZs) associated with deployment of an application; and a processor operatively connected to the datacenter via a communication network. The processor may be configured to: build an availability zone (AZ) application programming interface (API) and call the AZ API to retrieve the information data from the datacenter; dynamically and automatically determine, in response to calling the AZ API, prior to deploying the application, whether a first AZ defined in a deployment pipeline among the AZs within the datacenter is healthy for deployment of the application; and deploy the application utilizing the deployment pipeline when it is determined that the first AZ defined in the deployment pipeline is healthy. The processor also checks for another healthy AZ within the same datacenter or within other regions outside of the datacenter when it is determined that the first AZ is not healthy; replaces the unhealthy first AZ with new healthy AZ; updates new internet protocol (IP) address for a load balancer associated with the deployment of the application in response to replacing the unhealthy first AZ with the new healthy AZ; and updates firewall rules associated with the deployment of the application in response to replacing the unhealthy first AZ with the new healthy AZ.

According to another aspect of the present disclosure, when it is determined that the first availability zone does not have the required capacity, the processor may be further configured to: dynamically identify, in response to calling the availability zone API, a second availability zone that has a required capacity for deployment of the application among the plurality of availability zones within the same datacenter; automatically replace the first availability zone from the deployment pipeline with the second availability zone; and deploy the application utilizing the deployment pipeline with the second availability zone.

According to yet another aspect of the present disclosure, the processor may be further configured to: call a load balancer API after deployment of the application to update new internet protocol (IP) address for a load balancer associated with the deployment of the application in response to replacing the first availability zone with the second availability zone.

According to a further aspect of the present disclosure, the processor may be further configured to: call a firewall API after deployment of the application to update firewall rules associated with the deployment of the application in response to replacing the first availability zone with the second availability zone.

According to an additional aspect of the present disclosure, wherein when it is determined that none of the availability zones among the plurality of availability zones within the same datacenter has the required capacity, the processor may be further configured to: dynamically identify, in response to calling the availability zone API, a third availability zone that has a required capacity for deployment of the application from a new region outside of the datacenter; automatically replace the first availability zone from the deployment pipeline with the third availability zone; and deploy the application utilizing the deployment pipeline with the third availability zone.

According to yet another aspect of the present disclosure, the processor may be further configured to: call a load balancer API after deployment of the application to update new internet protocol (IP) address for a load balancer associated with the deployment of the application in response to replacing the first availability zone with the third availability zone.

According to an additional aspect of the present disclosure, the processor may be further configured to: call a firewall API after deployment of the application to update firewall rules associated with the deployment of the application in response to replacing the first availability zone with the third availability zone.

According to a further aspect of the present disclosure, the processor may be further configured to: call the availability zone API to retrieve information data corresponding to the deployment of the application from sources other than the datacenter.

According to an aspect of the present disclosure, a non-transitory computer readable medium configured to store instructions for implementing a smart cloud deployment module is disclosed. The instructions, when executed, may cause a processor to perform the following: accessing a datacenter that stores information data corresponding to a plurality of availability zones associated with deployment of an application; building an availability zone application programming interface (API); calling the availability zone API to retrieve the information data corresponding to the plurality of availability zones from the datacenter; dynamically determining, in response to calling the availability zone API, prior to deploying the application, whether a first availability zone defined in a deployment pipeline among the plurality of availability zones within the datacenter has a required capacity for deployment of the application; and deploying the application utilizing the deployment pipeline when it is determined that the first availability zone defined in the deployment pipeline has the required capacity. The instructions, when executed, may further cause the processor to perform the following: checking for another healthy AZ within the same datacenter or within other regions outside of the datacenter when it is determined that the first AZ is not healthy; replacing the unhealthy first AZ with new healthy AZ; updating new internet protocol (IP) address for a load balancer associated with the deployment of the application in response to replacing the unhealthy first AZ with the new healthy AZ; and updating firewall rules associated with the deployment of the application in response to replacing the unhealthy first AZ with the new healthy AZ.

According to another aspect of the present disclosure, when it is determined that the first availability zone does not have the required capacity, the instructions, when executed, may cause the processor to further perform the following: dynamically identifying, in response to calling the availability zone API, a second availability zone that has a required capacity for deployment of the application among the plurality of availability zones within the same datacenter; automatically replacing the first availability zone from the deployment pipeline with the second availability zone; and deploying the application utilizing the deployment pipeline with the second availability zone.

According to yet another aspect of the present disclosure, the instructions, when executed, may cause the processor to further perform the following: calling a load balancer API after deployment of the application to update new internet protocol (IP) address for a load balancer associated with the deployment of the application in response to replacing the first availability zone with the second availability zone.

According to a further aspect of the present disclosure, the instructions, when executed, may cause the processor to further perform the following: calling a firewall API after deployment of the application to update firewall rules associated with the deployment of the application in response to replacing the first availability zone with the second availability zone.

According to an additional aspect of the present disclosure, wherein when it is determined that none of the availability zones among the plurality of availability zones within the same datacenter has the required capacity, the instructions, when executed, may cause the processor to further perform the following: dynamically identifying, in response to calling the availability zone API, a third availability zone that has a required capacity for deployment of the application from a new region outside of the datacenter; automatically replacing the first availability zone from the deployment pipeline with the third availability zone; and deploying the application utilizing the deployment pipeline with the third availability zone.

According to yet another aspect of the present disclosure, the instructions, when executed, may cause the processor to further perform the following: calling a load balancer API after deployment of the application to update new internet protocol (IP) address for a load balancer associated with the deployment of the application in response to replacing the first availability zone with the third availability zone.

According to an additional aspect of the present disclosure, the instructions, when executed, may cause the processor to further perform the following: calling a firewall API after deployment of the application to update firewall rules associated with the deployment of the application in response to replacing the first availability zone with the third availability zone.

According to a further aspect of the present disclosure, the instructions, when executed, may cause the processor to further perform the following: calling the availability zone API to retrieve information data corresponding to the deployment of the application from sources other than the datacenter.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
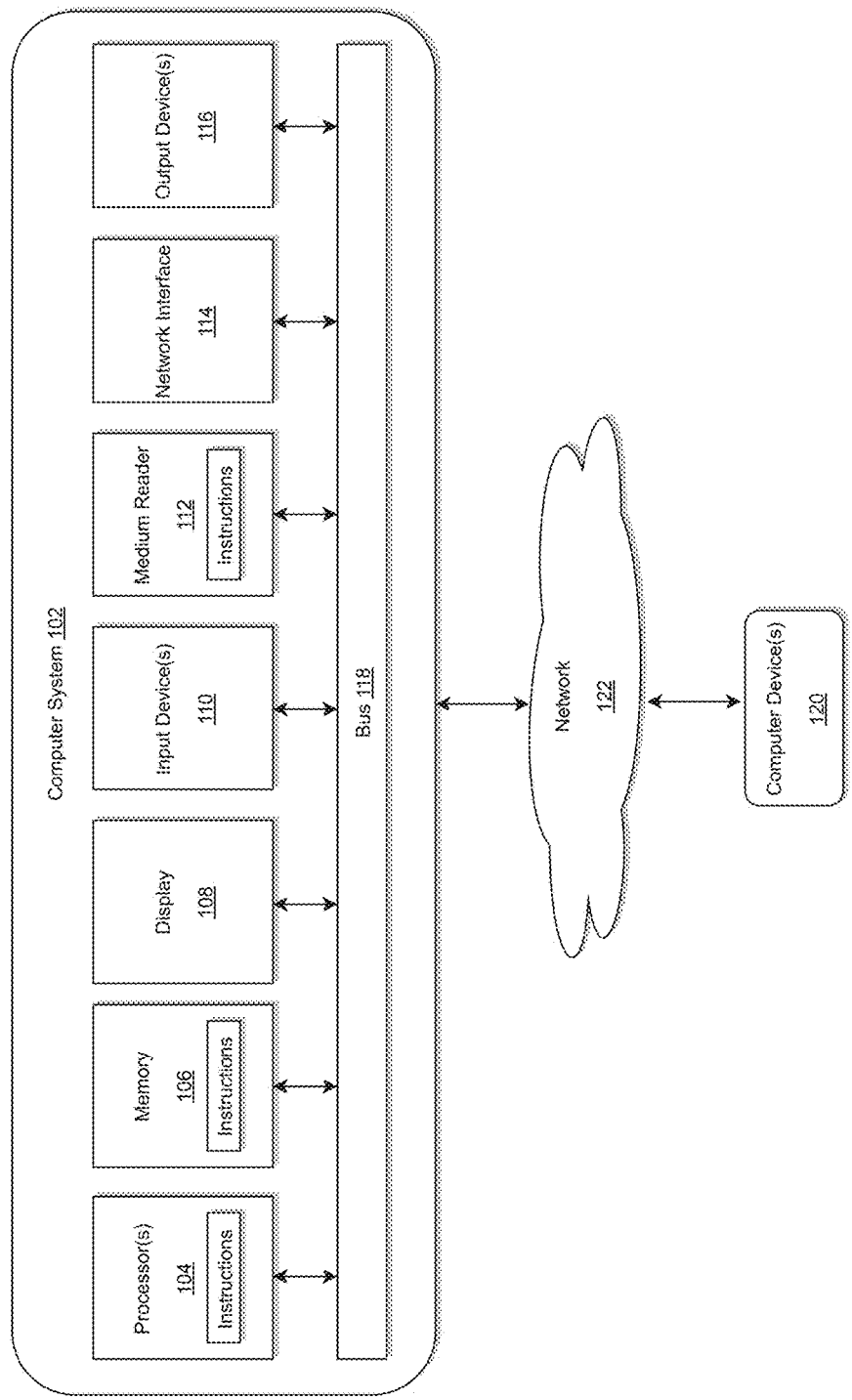
FIG. 1 illustrates a computer system for implementing a smart cloud deployment module in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 is an exemplary system for use in implementing a smart could deployment module that enables application teams to deploy their applications to healthy availability zones (AZs) in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecured and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

As described herein, various embodiments provide optimized processes of implementing a smart cloud deployment module that enables application teams to deploy their applications to healthy availability zones (AZs), thereby improving efficiency and productivity in developing, deploying, and supporting an application, but the disclosure is not limited thereto. For example, various embodiments may also provide optimized processes of implementing a smart cloud deployment module that builds an availability zone agnostic application that automatically determines capacity of an availability zone before the deployment and dynamically deploys to a new availability zone that has the required capacity, thereby reducing failed deployments, reducing support hours from application development and production support resources, shortening deployment windows, plugging and playing application programming interface (API) for quick integration with existing applications, dynamically migrating applications across availability zones, reducing production incidents and improving service level, but the disclosure is not limited thereto.

Figure 2:
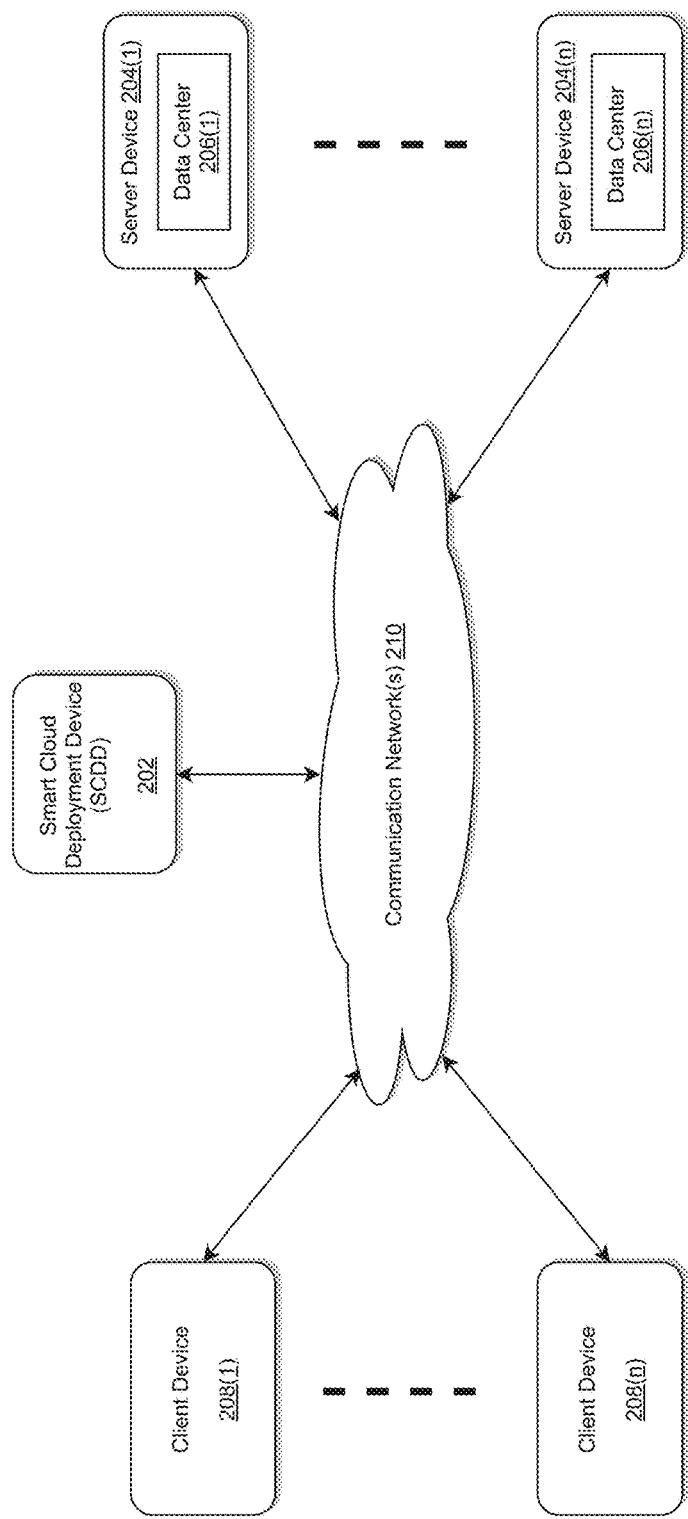
FIG. 2 illustrates an exemplary diagram of a network environment with a smart cloud deployment device in accordance with an exemplary embodiment.

Referring to FIG. 2, a schematic of an exemplary network environment 200 for implementing a smart cloud deployment device (SCDD) of the instant disclosure is illustrated.

According to exemplary embodiments, the above-described problems associated with conventional methods and systems may be overcome by implementing a SCDD 202 as illustrated in FIG. 2 by implementing a smart cloud deployment module that enables application teams to deploy their applications to healthy availability zones (AZs), thereby improving efficiency and productivity in developing, deploying, and supporting an application, but the disclosure is not limited thereto. For example, the above-described problems associated with conventional methods and systems may be overcome by implementing a SCDD 202 as illustrated in FIG. 2 by implementing a smart cloud deployment module that builds a availability zone (i.e., availability zone for deployment) agnostic application that automatically determines capacity of an availability zone before the deployment and dynamically deploys to a new availability zone that has the required capacity, thereby reducing failed deployments, reducing support hours from application development and production support resources, shortening deployment windows, plugging and playing application programming interface (API) for quick integration with existing applications, dynamically migrating applications across availability zones, reducing production incidents and improving service level, but the disclosure is not limited thereto.

The SCDD 202 may be the same or similar to the computer system 102 as described with respect to FIG. 1.

The SCDD 202 may store one or more applications that can include executable instructions that, when executed by the SCDD 202, cause the SCDD 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the SCDD 202 itself, may be located in virtual server(s) running in a cloud-based computing environment rather than being tied to one or more specific physical network computing devices. Also, the application(s) may be running in one or more virtual machines (VMs) executing on the SCDD 202. Additionally, in one or more embodiments of this technology, virtual machine(s) running on the SCDD 202 may be managed or supervised by a hypervisor.

In the network environment 200 of FIG. 2, the SCDD 202 is coupled to a plurality of server devices 204(1)-204(n) that hosts a plurality of datacenters 206(1)-206(n), and also to a plurality of client devices 208(1)-208(n) via communication network(s) 210. A communication interface of the SCDD 202, such as the network interface 114 of the computer system 102 of FIG. 1, operatively couples and communicates between the SCDD 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the SCDD 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The SCDD 202 may be a standalone device or integrated with one or more other devices or apparatuses, such as one or more of the server devices 204(1)-204(n), for example. In one particular example, the SCDD 202 may be hosted by one of the server devices 204(1)-204(n), and other arrangements are also possible. Moreover, one or more of the devices of the SCDD 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the SCDD 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the datacenters 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the SCDD 202 that may be configured for implementing a smart cloud deployment module that enables application teams to deploy their applications to healthy availability zones (AZs), thereby improving efficiency and productivity in developing, deploying, and supporting an application, but the disclosure is not limited thereto. For example, the client devices 208(1)-208(n) in this example may include any type of computing device that can facilitate the implementation of the SCDD 202 that may be configured for implementing a smart cloud deployment module that builds an availability zone agnostic application that automatically determines capacity of an availability zone before the deployment and dynamically deploys to a new availability zone that has the required capacity, thereby reducing failed deployments, reducing support hours from application development and production support resources, shortening deployment windows, plugging and playing application programming interface (API) for quick integration with existing applications, dynamically migrating applications across availability zones, reducing production incidents and improving service level, but the disclosure is not limited thereto.

Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, of other document collaborative software for example.

The client devices 208(1)-208(n) may run interface applications, such as standard web browsers or standalone client applications, which may provide an interface to communicate with the SCDD 202 via the communication network(s)

210 in order to communicate user requests. The client devices 208(1)-208(n) may further include, among other features, a display device, such as a display screen or touchscreen, and/or an input device, such as a keyboard, for example.

Although the exemplary network environment 200 with the SCDD 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the SCDD 202, the server devices 204(1)-204(n), or the client devices 208(1)-208(n), for example, may be configured to operate as virtual instances on the same physical machine. For example, one or more of the SCDD 202, the server devices 204(1)-204(n), or the client devices 208(1)-208(n) may operate on the same physical device rather than as separate devices communicating through communication network(s) 210. Additionally, there may be more or fewer SCDDs 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
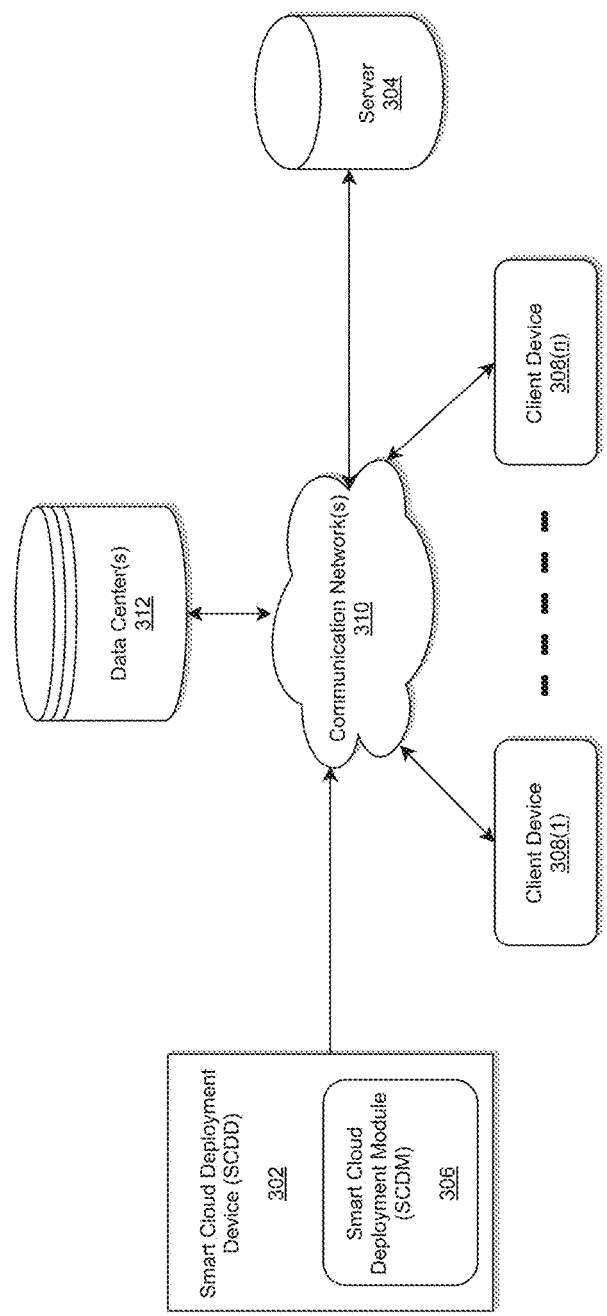
FIG. 3 illustrates a system diagram for implementing a smart cloud deployment device with a smart cloud deployment module in accordance with an exemplary embodiment.

FIG. 3 illustrates a system diagram 300 for implementing a SCDD with a smart cloud deployment module (SCDM) in accordance with an exemplary embodiment.

As illustrated in FIG. 3, the SCDD 302 including the SCDM 306 may be connected to a server 304, and a datacenter 312 via a communication network 310. The SCDD 302 may also be connected to a plurality of client devices 308(1)-308(n) via the communication network 310, but the disclosure is not limited thereto. According to exemplary embodiments, the SCDM 306 may be implemented within the client devices 308(1)-308(n), but the disclosure is not limited thereto. According to exemplary embodiments, the client devices 308(1)-308(n) may be utilized for implementing the SCDM 306 that builds an availability zone agnostic application that automatically determines capacity of an availability zone before the deployment and dynamically deploys to a new availability zone that has the required capacity, thereby reducing failed deployments, reducing support hours from application development and production support resources, shortening deployment windows, plugging and playing application programming interface (API) for quick integration with existing applications, dynamically migrating applications across availability zones, reducing production incidents and improving service level, but the disclosure is not limited thereto.

According to exemplary embodiment, the SCDD 302 is described and shown in FIG. 3 as including the SCDM 306, although it may include other rules, policies, modules, datacenters, or applications, for example. According to exemplary embodiments, the datacenter 312 may be embedded within the SCDD 302. Although only one datacenter 312 is illustrated in FIG. 3, according to exemplary embodiments, a plurality of datacenters 312 may be provided. The datacenter 312 may include one or more memories configured to store information data corresponding to a plurality of availability zones associated with deployment of an application but the disclosure is not limited thereto. For example, the datacenter 312 may include one or more memories configured to store information including: rules, programs, production requirements, testing requirements, control requirements, regulatory requirements, operational requirements, general other policies within an organization, etc., but the disclosure is not limited thereto. According to exemplary embodiments, the SCDM 306 may be configured to be storage platform agnostic—configured to be deployed across multiple storage layers.

According to exemplary embodiments, the SCDM 306 may be configured to receive continuous feed of data from the datacenter 312 and the server 304 via the communication network 310.

According to exemplary embodiments, the datacenter 312 may also be a private cloud-based datacenter that supports user authentication, datacenter security, and integration with existing datacenters and developments as well as stores open API specification definition file (i.e., in JSON format) corresponding to an application, but the disclosure is not limited thereto.

According to exemplary embodiments, the SCDM 406 may be implemented via user interfaces, e.g., web user interface, a build automation tool used primarily for Java projects, private Jenkins, etc., but the disclosure is not limited thereto, and may be integrated with a private cloud platform and a distributed file system platform via the SCDM 406 and an authentication service, but the disclosure is not limited thereto.

As will be described below, the SCDM 306 may be configured to access a datacenter that stores information data corresponding to a plurality of availability zones associated with deployment of an application; builds an availability zone application programming interface (API); calls the availability zone API to retrieve the information data corresponding to the plurality of availability zones from the datacenter; dynamically determines, in response to calling the availability zone API, prior to deploying the application, whether a first availability zone defined in a deployment pipeline among the plurality of availability zones within the datacenter has a required capacity for deployment of the application; and deploy the application utilizing the deployment pipeline when it is determined that the first availability zone defined in the deployment pipeline has the required capacity, but the disclosure is not limited thereto.

The plurality of client devices 308(1)-308(n) are illustrated as being in communication with the SCDD 302. In this regard, the plurality of client devices 308(1)-308(n) may be "clients" of the SCDD 302 and are described herein as such. Nevertheless, it is to be known and understood that the plurality of client devices 308(1)-308(n) need not necessarily be "clients" of the SCDD 302, or any entity described in association therewith herein. Any additional or alternative relationship may exist between either or more of the plurality of client devices 308(1)-308(n) and the SCDD 302, or no relationship may exist.

One of the plurality of client devices 308(1)-308(n) may be, for example, a smart phone or a personal computer. Of course, the plurality of client devices 308(1)-308(n) may be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, either one or more of the plurality of client devices 308(1)-308(n) may communicate with the SCDD 302 via broadband or cellular communication. Of course, these embodiments are merely exemplary and are not limiting or exhaustive.

Figure 4:
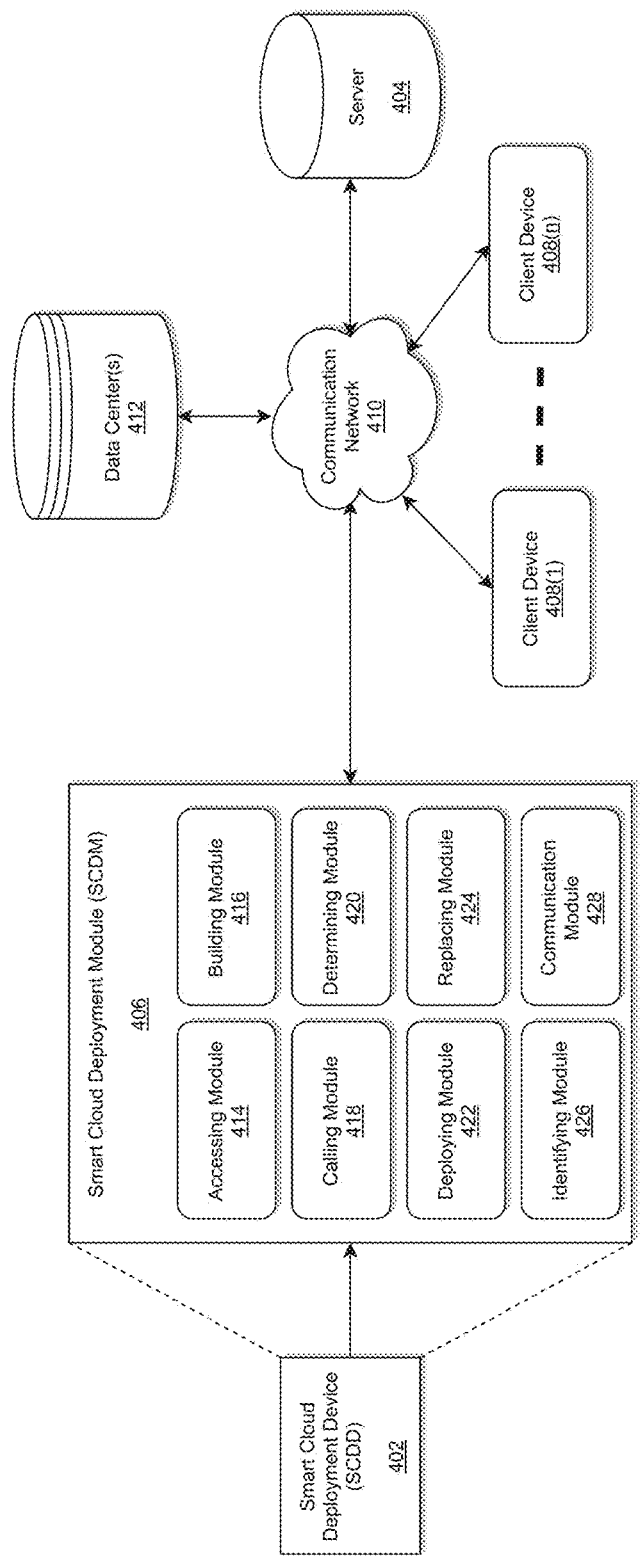
FIG. 4 illustrates a system diagram for implementing a smart cloud deployment module of FIG. 3 in accordance with an exemplary embodiment.

FIG. 4 illustrates a system diagram for implementing a SCDM of FIG. 3 in accordance with an exemplary embodiment.

As illustrated in FIG. 4, the system 400 may include a SCDD 402 within which a SCDM 406 may be embedded, a datacenter 412, a server 404, client devices 408(1)-408(n), and a communication network 410. According to exemplary embodiments, the SCDD 402, SCDM 406, datacenter 412, the server 404, the client devices 408(1)-408(n), and the communication network 410 as illustrated in FIG. 4 may be the same or similar to the SCDD 302, the SCDM 306, the datacenter 312, the server 304, the client devices 308(1)-308(n), and the communication network 310, respectively, as illustrated in FIG. 3.

As illustrated in FIG. 4, the SCDM 406 may include an accessing module 414, a building module 416, a calling module 418, a determining module 420, a deploying module 422, a replacing module 424, an identifying module 426, and a communication module 428. According to exemplary embodiments, the datacenter 412 may be external to the SCDD 402 may include various systems that are managed and operated by an organization. Alternatively, according to exemplary embodiments, the datacenter 412 may be embedded within the SCDD 402 and/or the SCDM 406.

The process may be executed via the communication module 428 and the communication network 410, which may comprise plural networks as described above. For example, in an exemplary embodiment, the various components of the SCDM 406 may communicate with the server 404, and the datacenter 412 via the communication module 428 and the communication network 410. Of course, these embodiments are merely exemplary and are not limiting or exhaustive.

According to exemplary embodiments, the communication network 410 and the communication module 428 may be configured to establish a link between the datacenter 412, the client devices 408(1)-408(n) and the SCDM 406.

According to exemplary embodiments, each of the accessing module 414, building module 416, calling module 418, determining module 420, deploying module 422, replacing module 424, identifying module 426, and the communication module 428 may be implemented by microprocessors or similar, they may be programmed using software (e.g., microcode) to perform various functions discussed herein and may optionally be driven by firmware and/or software. Alternatively, each of the accessing module 414, building module 416, calling module 418, determining module 420, deploying module 422, replacing module 424, identifying module 426, and the communication module 428 may be implemented by dedicated hardware, or as a combination of dedicated hardware to perform some functions and a processor (e.g., one or more programmed microprocessors and associated circuitry) to perform other functions.

Also, according to exemplary embodiments, each of the accessing module 414, building module 416, calling module 418, determining module 420, deploying module 422, replacing module 424, identifying module 426, and the communication module 428 may be physically separated into two or more interacting and discrete blocks, units, devices, and/or modules without departing from the scope of the inventive concepts.

According to exemplary embodiments, each of the accessing module 414, building module 416, calling module 418, determining module 420, deploying module 422, replacing module 424, identifying module 426, and the communication module 428 of the SCDM 406 may be called by corresponding API, but the disclosure is not limited thereto.

Figure 5:
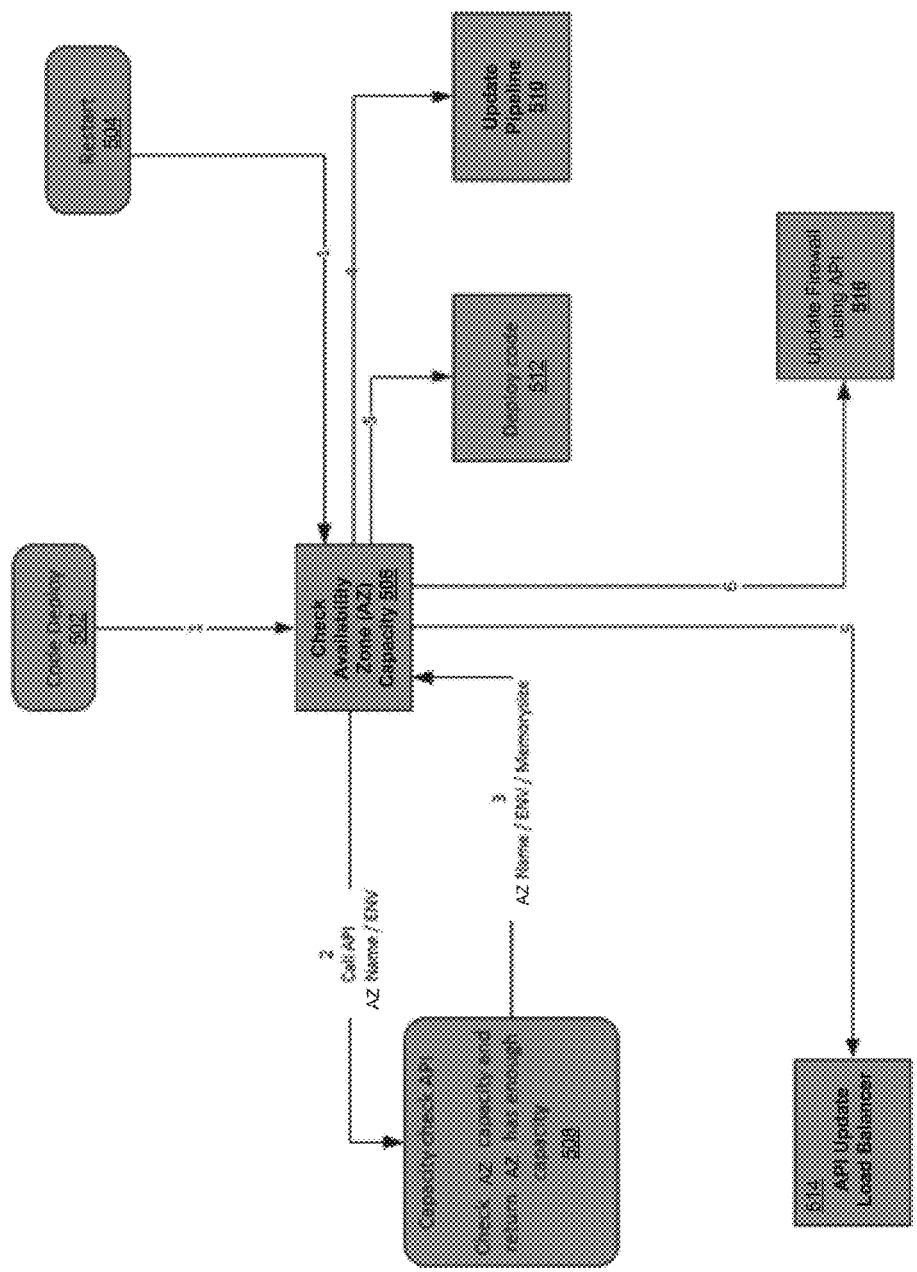
FIG. 5 illustrates an exemplary architecture diagram of finding a healthy availability zone implemented by the smart cloud deployment module of FIG. 4 in accordance with an exemplary embodiment.
Figure 6:
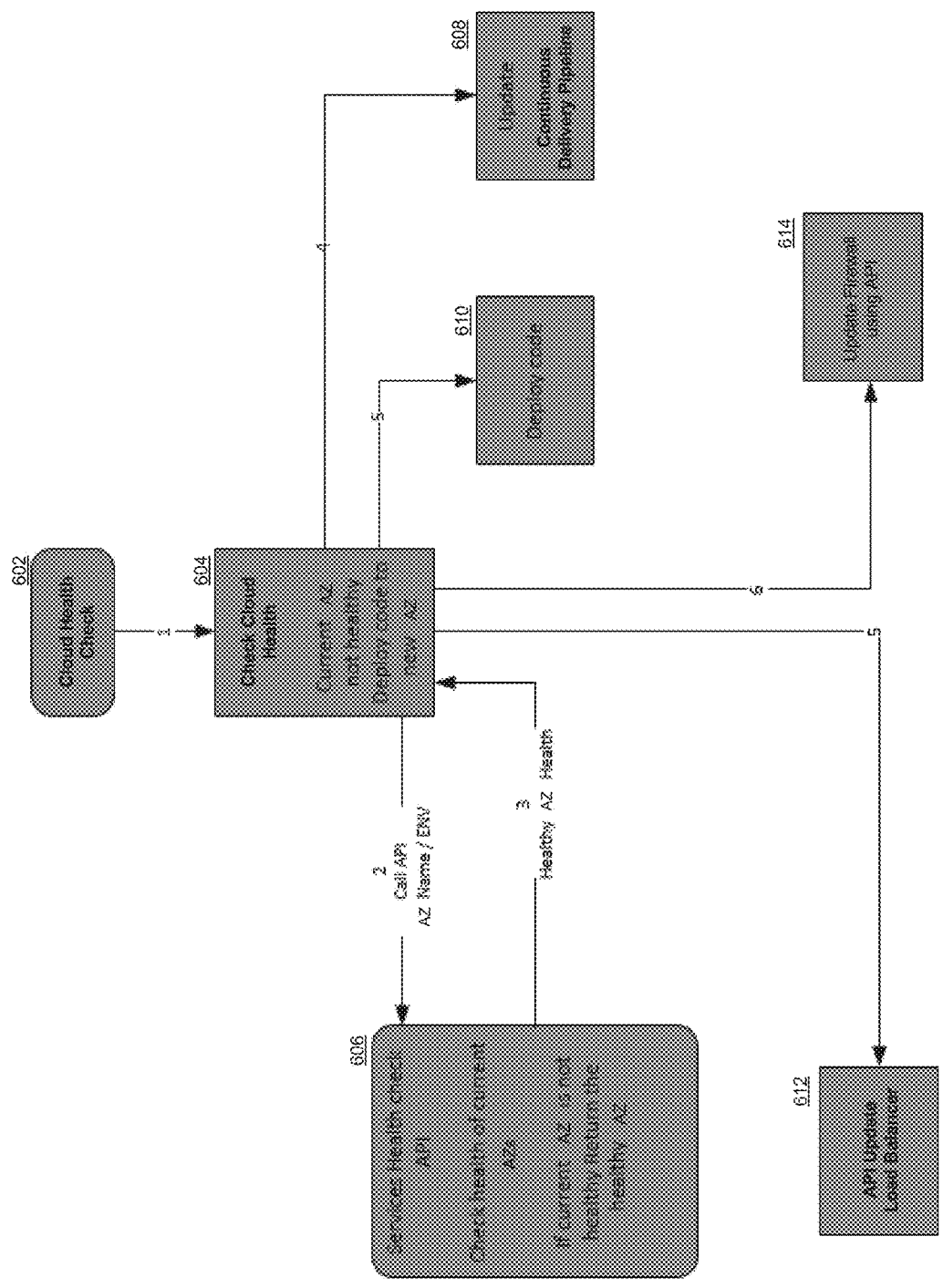
FIG. 6 illustrates an exemplary use case of service health check implemented by the smart cloud deployment module of FIG. 4 in accordance with an exemplary embodiment.
Figure 7:
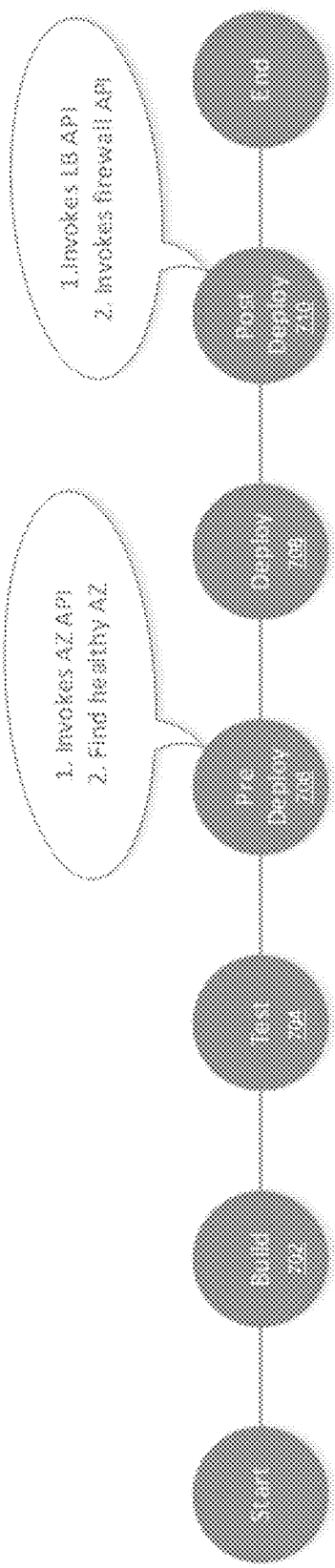
FIG. 7 illustrates an exemplary CICD (Continuous Integration and Continuous Delivery) pipeline implemented by the smart cloud deployment module of FIG. 4 in accordance with an exemplary embodiment.

FIG. 5 illustrates an exemplary architecture diagram 500 of finding a healthy availability zone implemented by the SCDM 406 of FIG. 4 in accordance with an exemplary embodiment. FIG. 6 illustrates an exemplary use case 600 of a service (i.e., a private cloud) health check implemented by the SCDM 406 of FIG. 4 in accordance with an exemplary embodiment. FIG. 7 illustrates an exemplary CICD (Continuous Integration and Continuous Delivery) pipeline 700 implemented by the SCDM 406 of FIG. 4 in accordance with an exemplary embodiment. The CICD pipeline 700 may include build stage 702, test stage 704, pre-deploy stage 706, deploy stage 708, and a post deploy stage 710.

For example, according to exemplary embodiments, the accessing module 414 may be configured to access the datacenter 412 that stores information data corresponding to a plurality of availability zones associated with deployment of an application. The building module 416 may be configured to build an availability zone application programming interface (API) and the calling module 418 may be configured to call the availability zone API to retrieve the information data corresponding to the plurality of availability zones from the datacenter 412. The determining module 420 may be configured to dynamically determine, in response to calling the availability zone API, prior to deploying the application, whether a first availability zone defined in a CICD pipeline 700 (i.e., Jenkins pipeline, but the disclosure is not limited thereto) among the plurality of availability zones within the datacenter 412 has a required capacity for deployment of the application. The deploying module 422 may be configured to deploy the application utilizing the CICD pipeline 700 when it is determined that the first availability zone defined in the CICD pipeline 700 has the required capacity.

As illustrated in FIG. 5, the exemplary architecture diagram 500 may include a code deploy block 502, a restart block 504, a check availability zone capacity block 506, and a capacity check API block which checks availability zone capacity and returns availability zone that has enough capacity. The exemplary architecture diagram 500 may also include a deploy code block 512 for deploying the code after checking that availability zone is healthy, an update pipeline block 510 for updating the CICD pipeline 700 (see, e.g., FIG. 7), an API update block 514 for updating a load balancer with new IP address after determining that old unhealthy availability zone is being replaced with a new healthy availability zone in the CICD pipeline 700. The exemplary architecture diagram 500 may also include an update firewall block 516 for updating firewall after determining that old unhealthy availability zone is being replaced with a new healthy availability zone in the CICD pipeline 700.

As illustrated in FIG. 6, the exemplary use case 600 of health check may include a cloud health check block 602, a determination block 604 for checking whether a current availability zone is healthy or not by calling services health check API block 606 which checks health of current availability zones in the CICD pipeline 700 (see, e.g., FIG. 7). If a current availability zone is not healthy, the services health check API block 606 returns a healthy availability zone to the check private cloud block 604. The deploy code block 610 then deploy the code in connection with an application. The exemplary use case 600 of health check may also include an update continuous delivery pipeline block 608 for updating the CICD pipeline 700 (see, e.g., FIG. 7), an API update block 612 for updating a load balancer with new IP address after determining that old unhealthy availability zone is being replaced with a new healthy availability zone in the CICD pipeline 700. The exemplary architecture diagram 500 may also include an update firewall block 614 for updating firewall after determining that old unhealthy availability zone is being replaced with a new healthy availability zone in the CICD pipeline 700. The "health" as disclosed herein may refer to whether an availability zone has required capacity for deployment of the application in the CICD pipeline 700.

Referring to FIGS. 4-7, according to exemplary embodiments, when it is determined by the determining module 420 (implemented within the check availability zone capacity block 506 or the check private cloud health block 604) that the first availability zone does not have the required capacity, the identifying module 426 dynamically identifies, in response to calling the availability zone API (i.e., capacity check API block 508, services health check API block 606), a second availability zone that has a required capacity for deployment of the application among the plurality of availability zones within the same datacenter 412. The replacing module 424 may be configured to automatically replace the first availability zone from the CICD pipeline 700 with the second availability zone and the deploying module 422 may be configured to deploy the application utilizing the CICD pipeline 700 with the second availability zone.

According to exemplary embodiments, the APIs are invoked at different stages of the CICD pipeline 700 using closures to deploy applications to healthy targets (i.e., healthy availability zones). Before deploy stage 708 (i.e., pre-deploy stage 706 as illustrated in FIG. 7), the AZ API may be invoked to check if the AZs defined in the CICD pipeline 700 are healthy or not. After deploy stage 708 (i.e., post deploy stage 710 as illustrated in FIG. 7), other APIs are invoked to update IP addresses and firewall rules if there is a change in target AZ.

For example, according to exemplary embodiments, the calling module 418 may be configured to call a load balancer API (i.e., from the API update load balancer block 514, 612) after deployment of the application (e.g., at post deploy stage 710 as illustrated in FIG. 7) to update new internet protocol (IP) address for a load balancer associated with the deployment of the application in response to replacing the first availability zone with the second availability zone.

According to exemplary embodiments, the calling module 418 may be configured to call a firewall API (by utilizing update firewall block 516, 614) after deployment of the application (e.g., at post deploy stage 710 as illustrated in FIG. 7) to update firewall rules associated with the deployment of the application in response to replacing the first availability zone with the second availability zone.

According to exemplary embodiments, when it is determined by the determining module 420 (implemented within the check availability zone capacity block 506 or the check private cloud health block 604) that none of the availability zones among the plurality of availability zones within the same datacenter 412 has the required capacity, the identifying module 426 dynamically identifies, in response to calling the availability zone API (i.e., capacity check API block 508, services health check API block 606), a third availability zone that has a required capacity for deployment of the application from a new region outside of the datacenter 412. The replacing module 424 may be configured to automatically replace the first availability zone from the CICD pipeline 700 with the third availability zone; and the deploying module 422 may be configured to deploy the application utilizing the CICD pipeline 700 with the third availability zone.

According to exemplary embodiments, the calling module 418 may be configured to call a load balancer API (i.e., from the API update load balancer block 514, 612) after deployment of the application (e.g., at post deploy stage 710 as illustrated in FIG. 7) to update new internet protocol (IP) address for a load balancer associated with the deployment of the application in response to replacing the first availability zone with the third availability zone.

According to exemplary embodiments, the calling module 418 may be configured to call a firewall API (by utilizing update firewall block 516, 614) after deployment of the application (e.g., at post deploy stage 710 as illustrated in FIG. 7) to update firewall rules associated with the deployment of the application in response to replacing the first availability zone with the third availability zone.

According to exemplary embodiments, the calling module 418 may be configured to call availability zone API to retrieve information data corresponding to the deployment of the application from sources other than the datacenter 412.

According to exemplary embodiments, the information data may include the following data: platform version that is being run, health information of all availability zones, and capacity details of all availability zones, etc., but the disclosure is not limited thereto.

Figure 8:
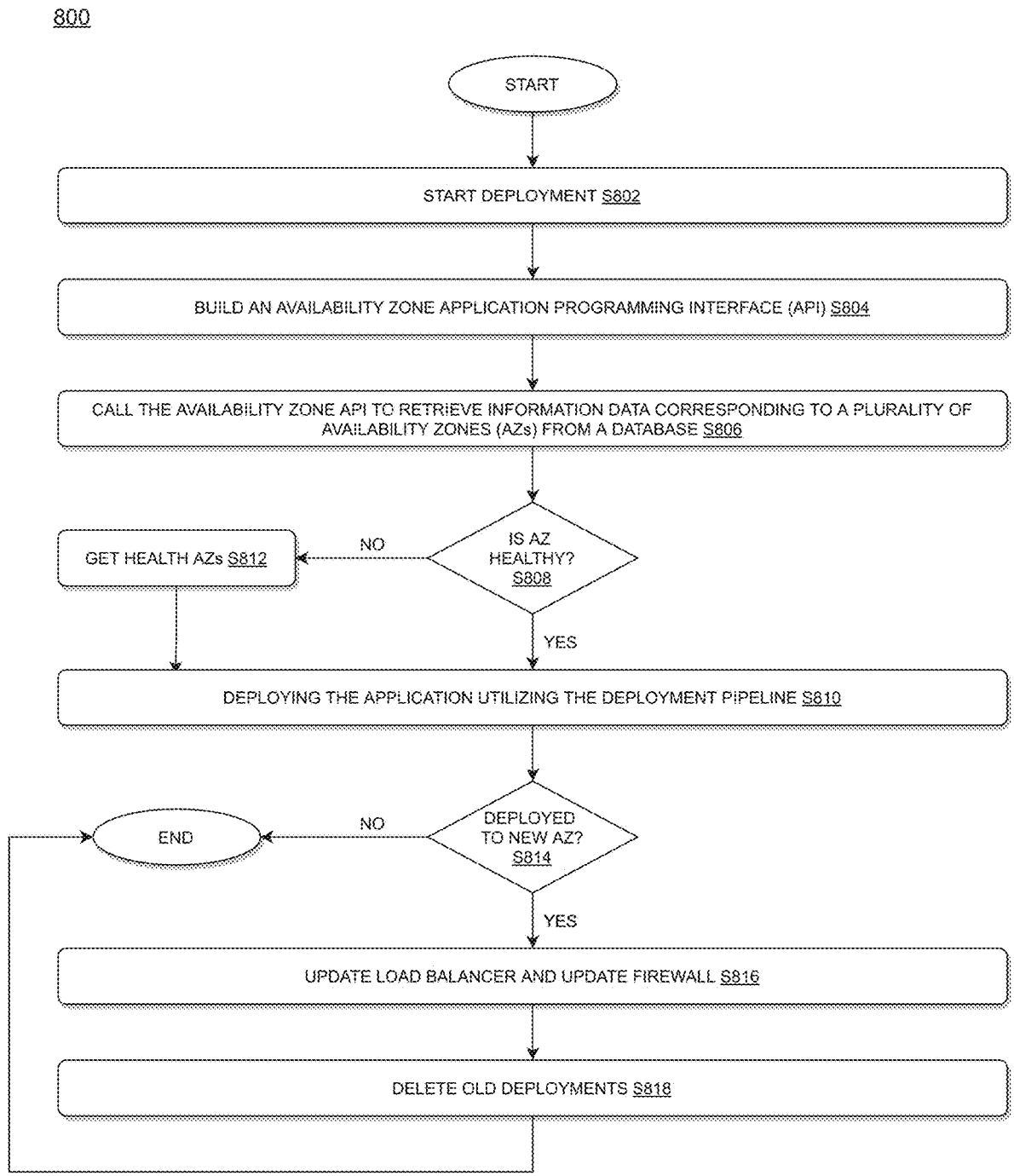
FIG. 8 illustrates a flow diagram for implementing a smart cloud deployment module in accordance with an exemplary embodiment.

FIG. 8 illustrates a flow diagram for implementing a smart cloud deployment module in accordance with an exemplary embodiment.

At step S802, the process 800 may start deployment of application or code (i.e., pre-deploy stage 706 as illustrated in FIG. 7) and access a datacenter that stores information data corresponding to a plurality of availability zones associated with deployment of an application.

At step S804, the process 800 may build an availability zone application programming interface (API).

At step S806, the process 800 may call the availability zone API to retrieve the information data corresponding to the plurality of availability zones from the datacenter.

At step S808, the process 800 may dynamically determine whether an availability zone is healthy or not. For example, in response to calling the availability zone API at step S806, prior to deploying the application, at step S808, the process may dynamically determine whether a first availability zone defined in a deployment pipeline among the plurality of availability zones within the datacenter has a required capacity for deployment of the application.

At step S810, the process 800 may deploy the application utilizing the deployment pipeline when it is determined at step S808 that the first availability zone defined in the deployment pipeline has the required capacity.

At step S812, the process 800 may get healthy availability zones when it is determined at step S808 that the first availability zone defined in the deployment pipeline does not have the required capacity. For example, according to exemplary embodiments, when it is determined at step S814 that the first availability zone does not have the required capacity, at step S812, the process 800 may dynamically identify, in response to calling the availability zone API, a second availability zone that has a required capacity for deployment of the application among the plurality of availability zones within the same datacenter and automatically replaces the first availability zone from the deployment pipeline with the second availability zone. At step 810, the process 800 may deploy the application utilizing the deployment pipeline with the second availability zone.

At step S814, the process 800 may determine whether the application is deployed into the new availability zone (i.e., the second availability zone). The process 800 is ended when it is determined at step S814 that the application is not deployed to a new availability zone.

According to exemplary embodiments, the process 800 may update, at step S816, load balancer with new IP address and firewall in connection with the deployment of the application when it is determined at step S814 that the application is deployed in a new availability zone. At step S818, the process 800 may delete old deployments and end the process.

According to exemplary embodiments, the process 800 may further include: calling a firewall API after deployment of the application to update firewall rules associated with the deployment of the application in response to replacing the first availability zone with the second availability zone.

According to exemplary embodiments, wherein when it is determined that none of the availability zones among the plurality of availability zones within the same datacenter has the required capacity, the process 800 may further include: dynamically identifying, in response to calling the availability zone API, a third availability zone that has a required capacity for deployment of the application from a new region outside of the datacenter; automatically replacing the first availability zone from the deployment pipeline with the third availability zone; and deploying the application utilizing the deployment pipeline with the third availability zone.

According to exemplary embodiments, the process 800 may further include: calling a load balancer API after deployment of the application to update new internet protocol (IP) address for a load balancer associated with the deployment of the application in response to replacing the first availability zone with the third availability zone.

According to exemplary embodiments, the process 800 may further include: calling a firewall API after deployment of the application to update firewall rules associated with the deployment of the application in response to replacing the first availability zone with the third availability zone.

According to exemplary embodiments, the process 800 may further include: calling the availability zone API to retrieve information data corresponding to the deployment of the application from sources other than the datacenter.

According to exemplary embodiments, the SCDD 402 may include a memory (e.g., a memory 106 as illustrated in FIG. 1) which may be a non-transitory computer readable medium that may be configured to store instructions for implementing the SCDM 406 for automatically building a availability zone (i.e., availability zone for deployment) agnostic application that automatically determines capacity of an availability zone before the deployment and dynamically deploys to a new availability zone that has the required capacity as disclosed herein. The SCDD 402 may also include a medium reader (e.g., a medium reader 112 as illustrated in FIG. 1) which may be configured to read any one or more sets of instructions, e.g., software, from any of the memories described herein. The instructions, when executed by a processor embedded within the SCDM 406 or within the SCDD 402, may be used to perform one or more of the methods and processes as described herein. In a particular embodiment, the instructions may reside completely, or at least partially, within the memory 106, the medium reader 112, and/or the processor 104 (see FIG. 1) during execution by the SCDD 402.

For example, the instructions, when executed, may cause the processor 104 to perform the following: accessing a datacenter that stores information data corresponding to a plurality of availability zones associated with deployment of an application; building an availability zone application programming interface (API); calling the availability zone API to retrieve the information data corresponding to the plurality of availability zones from the datacenter; dynamically determining, in response to calling the availability zone API, prior to deploying the application, whether a first availability zone defined in a deployment pipeline among the plurality of availability zones within the datacenter has a required capacity for deployment of the application; and deploying the application utilizing the deployment pipeline when it is determined that the first availability zone defined in the deployment pipeline has the required capacity, but the disclosure is not limited thereto.

For example, the instructions, when executed, may further cause the processor 104 to perform the following: checking for another healthy AZ within the same datacenter or within other regions outside of the datacenter when it is determined that the first AZ is not healthy; replacing the unhealthy first AZ with new healthy AZ; updating update new internet protocol (IP) address for a load balancer associated with the deployment of the application in response to replacing the unhealthy first AZ with the new healthy AZ; and updating firewall rules associated with the deployment of the application in response to replacing the unhealthy first AZ with the new healthy AZ, but the disclosure is not limited thereto.

According to exemplary embodiments, wherein, when it is determined that the first availability zone does not have the required capacity, the instructions, when executed, may cause the processor 104 to further perform the following: dynamically identifying, in response to calling the availability zone API, a second availability zone that has a required capacity for deployment of the application among the plurality of availability zones within the same datacenter; automatically replacing the first availability zone from the deployment pipeline with the second availability zone; and deploying the application utilizing the deployment pipeline with the second availability zone.

According to exemplary embodiments, the instructions, when executed, may cause the processor 104 to further perform the following: calling a load balancer API after deployment of the application to update new internet protocol (IP) address for a load balancer associated with the deployment of the application in response to replacing the first availability zone with the second availability zone.

According to exemplary embodiments, the instructions, when executed, may cause the processor 104 to further perform the following: calling a firewall API after deployment of the application to update firewall rules associated with the deployment of the application in response to replacing the first availability zone with the second availability zone.

According to exemplary embodiments, wherein when it is determined that none of the availability zones among the plurality of availability zones within the same datacenter has the required capacity, the instructions, when executed, may cause the processor 104 to further perform the following: dynamically identifying, in response to calling the availability zone API, a third availability zone that has a required capacity for deployment of the application from a new region outside of the datacenter; automatically replacing the first availability zone from the deployment pipeline with the third availability zone; and deploying the application utilizing the deployment pipeline with the third availability zone.

According to exemplary embodiments, the instructions, when executed, may cause the processor 104 to further perform the following: calling a load balancer API after deployment of the application to update new internet protocol (IP) address for a load balancer associated with the deployment of the application in response to replacing the first availability zone with the third availability zone.

According to exemplary embodiments, the instructions, when executed, may cause the processor 104 to further perform the following: calling a firewall API after deployment of the application to update firewall rules associated with the deployment of the application in response to replacing the first availability zone with the third availability zone.

According to exemplary embodiments, the instructions, when executed, may cause the processor 104 to further perform the following: calling the availability zone API to retrieve information data corresponding to the deployment of the application from sources other than the datacenter.

According to exemplary embodiments as disclosed above in FIGS. 1-8, technical improvements effected by the instant disclosure may include platforms for implementing a smart cloud deployment module that enables application teams to deploy their applications to healthy availability zones (AZs), thereby improving efficiency and productivity in developing, deploying, and supporting an application, but the disclosure is not limited thereto. For example, According to exemplary embodiments as disclosed above in FIGS. 1-8, technical improvements effected by the instant disclosure may include platforms for implementing a smart cloud deployment module that builds an availability zone agnostic application that automatically determines capacity of an availability zone before the deployment and dynamically deploys to a new availability zone that has the required capacity, thereby reducing failed deployments, reducing support hours from application development and production support resources, shortening deployment windows, plugging and playing application programming interface (API) for quick integration with existing applications, dynamically migrating applications across availability zones, reducing production incidents and improving service level, but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database/datacenter, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for implementing a smart cloud deployment module by utilizing one or more processors and one or more memories, the method comprising:
   providing a datacenter that stores information data corresponding to a plurality of availability zones associated with deployment of an application;
   building an availability zone application programming interface (API);
   calling the availability zone API to retrieve the information data corresponding to the plurality of availability zones from the datacenter;
   dynamically determining, in response to calling the availability zone API, prior to deploying the application, whether a first availability zone defined in a deployment pipeline among the plurality of availability zones within the datacenter has a required capacity for deployment of the application; and
   deploying the application utilizing the deployment pipeline when it is determined that the first availability zone defined in the deployment pipeline has the required capacity; and
   wherein, when it is determined that the first availability zone does not have the required capacity, the method further comprising:
   dynamically identifying, in response to calling the availability zone API, a second availability zone that has a required capacity for deployment of the application among the plurality of availability zones within the same datacenter;
   automatically replacing the first availability zone from the deployment pipeline with the second availability zone;
   deploying the application utilizing the deployment pipeline with the second availability zone; and
   calling a firewall API after deployment of the application to update firewall rules associated with the deployment of the application in response to replacing the first availability zone with the second availability zone.

2. The method according to claim 1, further comprising:
   calling a load balancer API after deployment of the application to update new internet protocol (IP) address for a load balancer associated with the deployment of the application in response to replacing the first availability zone with the second availability zone.

3. The method according to claim 1, wherein when it is determined that none of the availability zones among the plurality of availability zones within the same datacenter has the required capacity, the method further comprising:
   dynamically identifying, in response to calling the availability zone API, a third availability zone that has a required capacity for deployment of the application from a new region outside of the datacenter;
   automatically replacing the first availability zone from the deployment pipeline with the third availability zone; and
   deploying the application utilizing the deployment pipeline with the third availability zone.

4. The method according to claim 3, further comprising:
   calling a load balancer API after deployment of the application to update new internet protocol (IP) address for a load balancer associated with the deployment of the application in response to replacing the first availability zone with the third availability zone.

5. The method according to claim 3, further comprising:
   calling a firewall API after deployment of the application to update firewall rules associated with the deployment of the application in response to replacing the first availability zone with the third availability zone.

6. The method according to claim 1, further comprising:
   calling the availability zone API to retrieve information data corresponding to the deployment of the application from sources other than the datacenter.

7. The method according to claim 6, wherein the information data includes the following data: platform version that is being run, health information of all availability zones, and capacity details of all availability zones.

8. A system for implementing a smart cloud deployment module, the system comprising:
   a datacenter that stores information data corresponding to a plurality of availability zones associated with deployment of an application;
   a processor; and
   a memory operatively connected to the processor and the datacenter via a communication interface, the memory storing computer readable instructions, when executed, causes the processor to:
   build an availability zone application programming interface (API);
   call the availability zone API to retrieve the information data corresponding to the plurality of availability zones from the datacenter;
   dynamically determine, in response to calling the availability zone API, prior to deploying the application, whether a first availability zone defined in a deployment pipeline among the plurality of availability zones within the datacenter has a required capacity for deployment of the application; and deploy the application utilizing the deployment pipeline when it is determined that the first availability zone defined in the deployment pipeline has the required capacity;

wherein, when it is determined that the first availability zone does not have the required capacity, the processor is further configured to:

dynamically identify, in response to calling the availability zone API, a second availability zone that has a required capacity for deployment of the application among the plurality of availability zones within the same datacenter;

automatically replace the first availability zone from the deployment pipeline with the second availability zone;

deploy the application utilizing the deployment pipeline with the second availability zone; and call a firewall API after deployment of the application to update firewall rules associated with the deployment of the application in response to replacing the first availability zone with the second availability zone.

9. The system according to claim 8, wherein the processor is further configured to:

call a load balancer API after deployment of the application to update new internet protocol (IP) address for a load balancer associated with the deployment of the application in response to replacing the first availability zone with the second availability zone.

10. The system according to claim 8, wherein when it is determined that none of the availability zones among the plurality of availability zones within the same datacenter has the required capacity, the processor is further configured to:

dynamically identify, in response to calling the availability zone API, a third availability zone that has a required capacity for deployment of the application from a new region outside of the datacenter;

automatically replace the first availability zone from the deployment pipeline with the third availability zone; and deploy the application utilizing the deployment pipeline with the third availability zone.

11. The system according to claim 10, wherein the processor is further configured to:

call a load balancer API after deployment of the application to update new internet protocol (IP) address for a load balancer associated with the deployment of the application in response to replacing the first availability zone with the third availability zone.

12. The system according to claim 10, wherein the processor is further configured to:

call a firewall API after deployment of the application to update firewall rules associated with the deployment of the application in response to replacing the first availability zone with the third availability zone.

13. The system according to claim 8, wherein the processor is further configured to:

call the availability zone API to retrieve information data corresponding to the deployment of the application from sources other than the datacenter.

14. The system according to claim 13, wherein the information data includes the following data: platform version that is being run, health information of all availability zones, and capacity details of all availability zones.

15. A non-transitory computer readable medium configured to store instructions for implementing a smart cloud deployment module, wherein, when executed, the instructions cause a processor to perform the following:

causing a datacenter to store information data corresponding to a plurality of availability zones associated with deployment of an application;

building an availability zone application programming interface (API);

calling the availability zone API to retrieve the information data corresponding to the plurality of availability zones from the datacenter;

dynamically determining, in response to calling the availability zone API, prior to deploying the application, whether a first availability zone defined in a deployment pipeline among the plurality of availability zones within the datacenter has a required capacity for deployment of the application; and deploying the application utilizing the deployment pipeline when it is determined that the first availability zone defined in the deployment pipeline has the required capacity; and wherein, when it is determined that the first availability zone does not have the required capacity, the instructions, when executed, further cause the processor to perform the following:

dynamically identifying, in response to calling the availability zone API, a second availability zone that has a required capacity for deployment of the application among the plurality of availability zones within the same datacenter;

automatically replacing the first availability zone from the deployment pipeline with the second availability zone;

deploying the application utilizing the deployment pipeline with the second availability zone; and calling a firewall API after deployment of the application to update firewall rules associated with the deployment of the application in response to replacing the first availability zone with the second availability zone.

16. The non-transitory computer readable medium according to claim 15, the instructions, when executed, further cause the processor to perform the following:

calling a load balancer API after deployment of the application to update new internet protocol (IP) address for a load balancer associated with the deployment of the application in response to replacing the first availability zone with the second availability zone.

17. The non-transitory computer readable medium according to claim 15, wherein when it is determined that none of the availability zones among the plurality of availability zones within the same datacenter has the required capacity, the instructions, when executed, further cause the processor to perform the following:

dynamically identifying, in response to calling the availability zone API, a third availability zone that has a required capacity for deployment of the application from a new region outside of the datacenter;

automatically replacing the first availability zone from the deployment pipeline with the third availability zone; and deploying the application utilizing the deployment pipeline with the third availability zone.

18. The non-transitory computer readable medium according to claim 17, wherein the instructions, when executed, further cause the processor to perform the following:

calling a load balancer API after deployment of the application to update new internet protocol (IP) address for a load balancer associated with the deployment of the application in response to replacing the first availability zone with the third availability zone.

19. The non-transitory computer readable medium according to claim 15, wherein the instructions, when executed, further cause the processor to perform the following:
   calling the availability zone API to retrieve information data corresponding to the deployment of the application from sources other than the datacenter.

20. The non-transitory computer readable medium according to claim 15, wherein the instructions, when executed, further cause the processor to perform the following:
   wherein the information data includes the following data: platform version that is being run, health information of all availability zones, and capacity details of all availability zones.

* * * * *